May 13, 1958  G. A. KNIGHT  2,834,123
INTERPRETING CONVERTER
Filed June 30, 1955  4 Sheets-Sheet 1

INVENTOR.
GEORGE A. KNIGHT
BY
ATTORNEYS

May 13, 1958     G. A. KNIGHT     2,834,123
INTERPRETING CONVERTER

Filed June 30, 1955     4 Sheets-Sheet 2

INVENTOR.
GEORGE A. KNIGHT
BY
ATTORNEYS

May 13, 1958     G. A. KNIGHT     2,834,123
INTERPRETING CONVERTER

Filed June 30, 1955     4 Sheets-Sheet 3

INVENTOR.
GEORGE A. KNIGHT
BY
ATTORNEYS

May 13, 1958  G. A. KNIGHT  2,834,123
INTERPRETING CONVERTER
Filed June 30, 1955  4 Sheets-Sheet 4
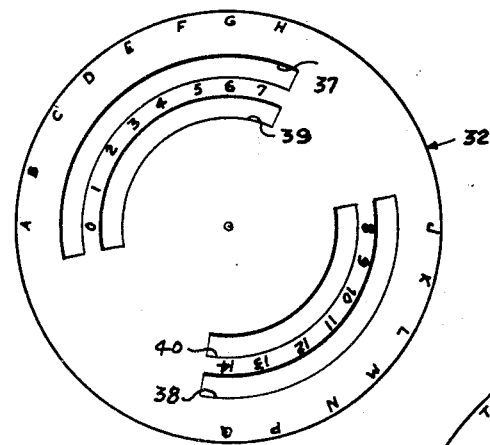
Fig 10
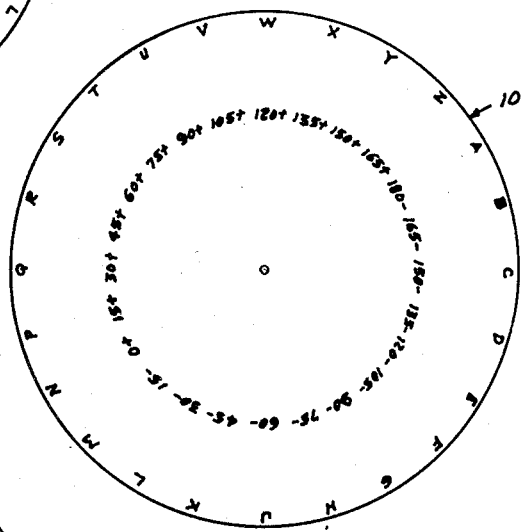
Fig-12
Fig-11
INVENTOR.
GEORGE A. KNIGHT
BY
ATTORNEYS

United States Patent Office 2,834,123
Patented May 13, 1958

2,834,123

INTERPRETING CONVERTER

George A. Knight, Berlin, Germany

Application June 30, 1955, Serial No. 519,283

4 Claims. (Cl. 35—2)

(Granted under Title 35, U. S. Code (1952), sec. 266)

The invention described herein may be manufactured and used by or for the United States Government for governmental purposes without payment to me of any royalty thereon.

This invention relates to a converter whereby geographic coordinates may be directly converted to geographic reference code designations, which may be abbreviated as Georef designators, and vice versa with a simple operation.

To provide a proper understanding of the invention, the Georef system, as it is called, is a highly simplified method of determining geographic location expressing latitude and longitude in a form suitable for rapid plotting. The system obviates the difficulties and confusion arising both from conventional latitude and longitude references and from the great complexity of rectangular grids in use over large areas by ground forces. The Georef system may be applied to any graduated map or chart regardless of the type of projection and is based on a graticule of meridans of longitude and parallels of latitude of which the prime meridian is that of Greenwich with the point of origin at the South Pole on the 180th meridian. By the Georef system, the surface of the earth is divided into quadrangles, the sides of which are specific arc lengths of longitude and latitude, each guadrant being identified by a simple systematic lettered code giving positive identification with no risk of ambiguity.

There are 24 longitudinal zones with each 15° in width, that is one hour in time each, extending eastward from the 180th meridian. These zones are lettered A to Z inclusive with the letters I and O being omitted. There are 12 bands of latitude, each of 15° depth extending northward from the South Pole to the North Pole. The bands are lettered from A to M inclusive, omitting I, northward from the South Pole. This results in the earth's surface being divided into 288 15° quadrangles, each of which is identified by two letters, the first letter being that of a longitudinal zone, and the second that of a latitude band. For example, Seoul, Korea is in a 15° quadrangle identified by the letters WJ.

Each 15° quadrangle is further subdivided into equal fifteen 1° zones of longitude eastward from the western meridian of the quadrangle. The 1° increments of longitude are designated by letters A to Q inclusive with the letters I and O being omitted. Each 15° quadrangle is also subdivided into fifteen 1° bands of latitude northward from the southern parallel of the quadrangle. These 1° increments of latitude are similarly lettered A to Q, omitting I and O. Thus, a 1° quadrangle anywhere on the earth's surface can be identified by four letters, the first two being the reference to the specific 15° quadrangle, the third letter identifying the 1° longitude zone therein and the fourth letter identifying the 1° latitude band. Thus, Seoul, Korea is in the 1° quadrangle WJGH.

The primary object of the present invention is to provide a device that rapidly converts geographic coordinates of longitude and latitude to the code symbols of the Georef system and vice versa.

Other objects of this invention will be readily perceived from the following description.

This invention relates to an interpreting device for interconversion of conventional geographic longitude and latitude indicia and their corresponding code symbols in the Georef system. A main disk is provided with four disks superimposed on each side of the main disk and relatively rotatable about a common center with the disks decreasing in diameter from the main disk. The main disk has two circularly arranged scales on each side spaced from each other with one of the scales on each side of the disk being disposed along the periphery on each side of the main disk. Each of the remaining three largest disks on each side of the main disk has two circularly arranged scales spaced from each other with one of the scales disposed along the periphery of each of the disks. All of the scales along the periphery of the three remaining largest disks on one side of the main disk and the scale along the periphery of the one side of the main disk have one of the geographic longitude and latitude indicia and all of the inner spaced scales of these same three remaining largest disks and the inner spaced scale of the one side of the main disk have Georef code symbols. The other side of the main disk and the three remaining largest disks on this other side of the main disk have the Georef symbols on the periphery scales and the geographic longitude and latitude indicia on the inner scales. The smallest disk on one side of the main disk has means to convert the geographic indicia on the periphery scales to the corresponding Georef code symbols on the inner scales. Similarly, the smallest disk on the other side of the main disk includes means to convert the Georef code symbols on the periphery scales to the corresponding indicia on the inner scales.

The attached drawings illustrate a preferred embodiment of the invention, in which—

Figure 10 is a plan view of the third largest disk of the assembly of Figure 7;

Figure 11 is a plan view of the second largest disk of the assembly of Figure 7; and Figure 12 is a plan view of the largest disk of the assembly of Figure 7.

Figure 1:
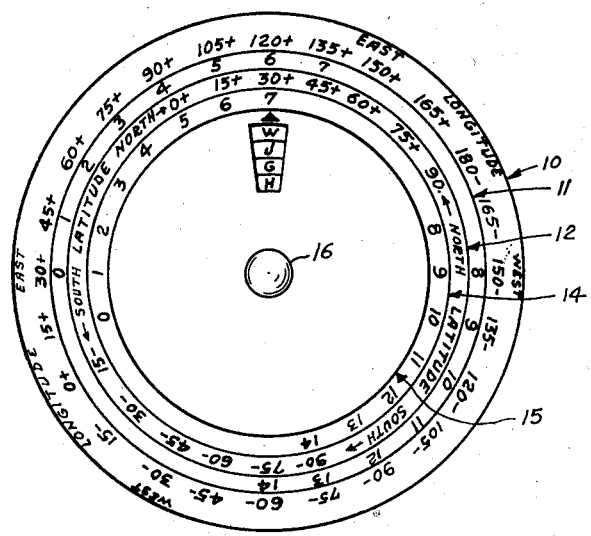
Figure 1 is a plan view of one side of the assembly of the present invention.

Referring to the drawings and particularly Figure 1, there is shown a plurality of disks including a main and largest disk 10, a second largest disk 11, a third largest disk 12, a fourth largest disk 14, and a smallest disk 15. These disks are all secured together by suitable securing means such as a pin 16 and are individually rotatable about the pin 16.

Figure 6:
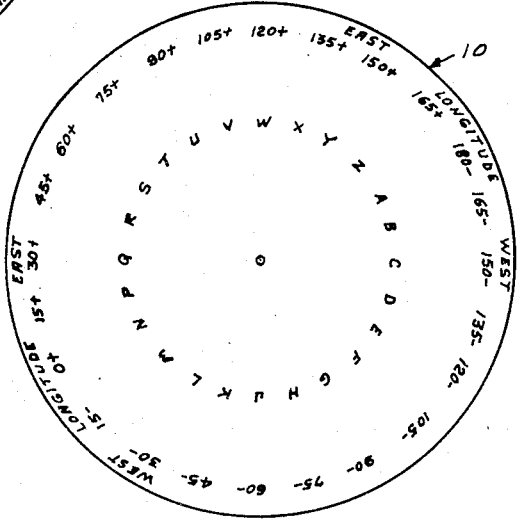
Figure 6 is a plan view of the largest disk of the assembly of Figure 1.

As shown more clearly in Figure 6, one side of the main disk 10 is provided with a scale along its periphery and a second scale spaced inwardly therefrom. The periphery scale of the main disk 10 has 24 graduations indicating 15° increments of longitude equally spaced about the circumference of the scale. The inner scale of the main disk 10 is equally divided into 24 similar graduations with each graduation indicating a code symbol that corresponds to the longitude indicia on the periphery scale. Thus, the graduations on the inner scale consist of the letters A to Z inclusive, omitting I and O. As previously explained in the example relating to Seoul, Korea, the letter W, which is the code symbol in the Georef system for 120° longitude east, is disposed on the same radius emanating from the center axis as the graduation indicating 120° east longitude.

Figure 5:
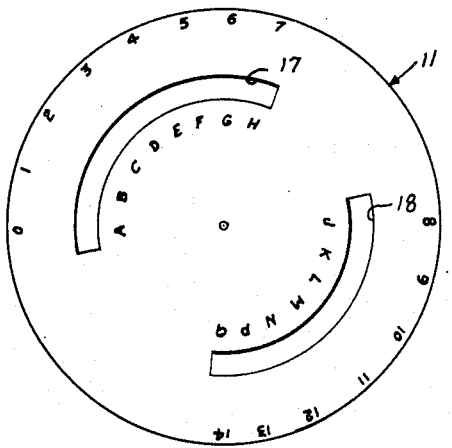
Figure 5 is a plan view of the second largest disk of the assembly of Figure 1.

As shown in Figure 5, the second largest disk 11 has a scale on its periphery and a second circularly arranged scale inwardly spaced from the periphery scale. The periphery scale of the disk 11 has 15 graduations showing the numerals 0 to 14. These numerals are spaced the same distance apart as the graduations on the scale of the disk 10; thus, the numerals will not extend about the entire circumference of the scale since there are less than 24 graduations.

While the preferred example shows the numerals 0 to 7 on one portion of the periphery scale of the disk 11 and the numerals 8 to 14 on the diametrically opposite portion, it will be understood that the numerals could all be disposed on the same arc portion of the scale, if desired. The inner scale of the disk 11 has letters that correspond to each of the longitude increments shown on the periphery scale. Each of these letters is on the same radius emanating from the center of the disk as the longitude increment to which it corresponds. In the previously discussed example of Seoul, Korea, the longitude increment of 6° is represented in the Georef system by the letter G; it will be observed from Figure 5 that the numeral 6 on the periphery scale and the letter G on the inner scale are on the same radius emanating from the center of the disk. In order for the code symbols on the inner scale of the main disk 10 to be visible after the disk 11 is mounted thereon, the disk 11 is provided with a pair of arcuate openings 17 and 18.

The third largest disk 12 includes a periphery scale having 13 graduations indicating 15° increments of latitude spaced the same distance apart as the graduations on the scales of the disk 10. As previously explained with regard to the disk 11 these graduations do not extend about the entire circumference; similarly, while the latitude increments have been shown on two diametrically opposite portions of the scale, it will be understood that all of the latitude graduations could be on one arcuate portion of the scale, if desired.

The inner scale on the disk 12 has the code symbols of the Georef system corresponding to the 15° latitude bands. Each of these code symbols is on the same radius emanating from the center as its corresponding 15° latitude increment. In the example previously explained with respect to Seoul, Korea, the 30° north latitude band and its Georef system code symbol J are on the same radius emanating from the center of the disk 12. It will be observed that the lettering starts from the South Pole (−90) as explained in the discussion of the Georef system.

Figure 4:
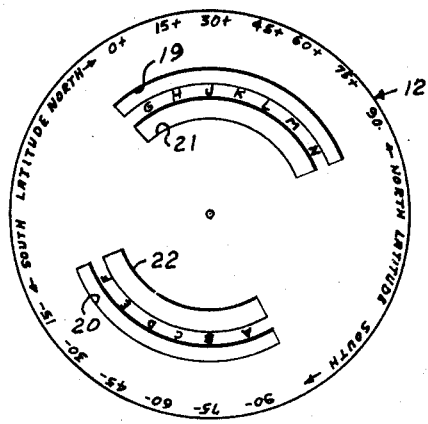
Figure 4 is a plan view of the third largest disk of the assembly of Figure 1.

The third largest disk 12 has two outer arcuate openings 19 and 20, which are located between the inner scale and the periphery scale. The disk 12 also has a pair of inner arcuate openings 21 and 22 that are disposed inside of the inner scale (see Fig. 4). Thus, when the third largest disk 12 is assembled over the disks 10 and 11 the code symbols on the inner scale of the disk 10 may be viewed through the outer arcuate openings 19 and 20 of the disk 12 while the code symbols of the inner scale of the disk 11 are visible through the inner arcuate openings 21 and 22. This arrangement permits the longitude and latitude symbols, which represent the 15° longitude and latitude increments, to be adjacent to each other even though the corresponding geographic indicia are not adjacent.

Figure 3:
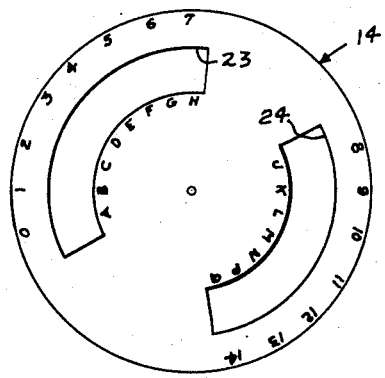
Figure 3 is a plan view of the fourth largest disk of the assembly of Figure 1.

As shown clearly in Figure 3, the fourth largest disk 14 has a periphery scale that is the exact duplicate of the periphery scale of the disk 11 and has an inner scale that is the exact duplicate of the inner scale of the disk 11. In view of the explanation given with respect to the disk 11, it is not believed that a detailed explanation of the relationship of the numerals and the letters of the scales of Figure 3 is necessary but it should be understood that the numerals on the periphery scale of the disk 14 represent the 1° latitude increments while the numerals on the disk 11 represent 1° longitude increments. The disk 14 is provided with a pair of arcuate openings 23 and 24 that are of sufficient size to permit the letter symbols on the inner scales of the disks 10, 11 and 12 to be viewed therethrough.

Figure 2:
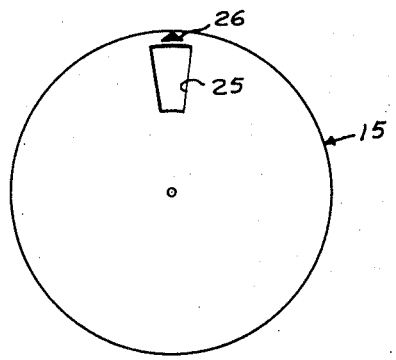
Figure 2 is a plan view of the smallest disk of the assembly of Figure 1.

As shown in Figure 2, the smallest disk 15 has an arcuate window 25 that will permit only a single letter from the inner scale of each of the four largest disks to be viewed. An indicating marker 26 is disposed on the smallest disk 15 above the arcuate window 25.

Considering the example of Seoul, Korea which has a longitude of 126° E. and a latitude of 37° N., it will be seen from Figure 1 that the alignment of this longitude and latitude on the periphery scales of the four disks 10, 11, 12 and 14 will result in the corresponding Georef code symbols, which are WJGH, being viewed in the arcuate window 25 of the disk 15 when the marker 26 points to this geographic longitude and latitude indicia.

Figure 7:
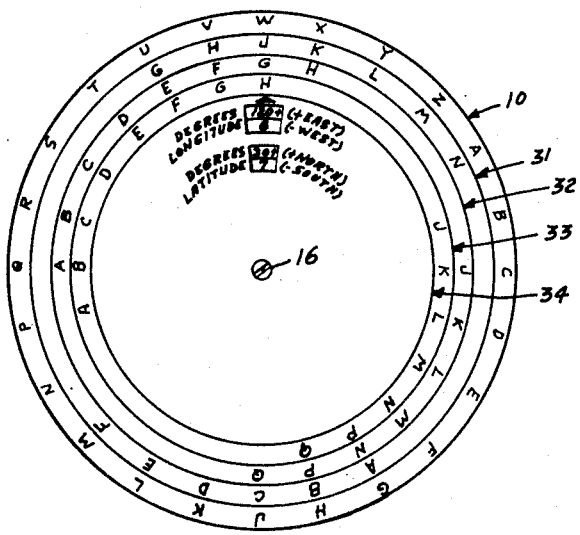
Figure 7 is a plan view of the other side of the assembly of the present invention.

Referring to Figure 7, the other side of the present invention is shown. This includes the main and largest disk 10, a second largest disk 31, a third largest disk 32, a fourth largest disk 33, and a smallest disk 34. These disks are secured together by the pin 16 and are rotatable with respect to each other about the pin 16.

As shown in Figure 12, the disk 10 has a periphery scale and an inner scale spaced from the periphery scale. The inner scale of this side of the disk 10 is provided with 24 graduations indicating 15° increments of longitude while the periphery scale has 24 graduations indicating the corresponding code symbols in the Georef system of the 15° longitude increments. Thus, the two scales are merely reversed in position from the scales of the opposite side of the disk 10.

The second largest disk 31, as shown in Figure 11, has 13 graduations on its inner scale indicating 15 degree increments of latitude with the corresponding Georef system code symbols on the periphery scale. These increments and symbols are disposed in the same relationship as the georgraphic indicia and code symbols of the disk 12 except that the scales are reversed. The disk 31 is provided with a pair of arcuate openings 35 and 36, which are disposed between the periphery and inner scales. These arcuate openings permit the inner scale of the disk 10 to be viewed when the disk 31 is mounted on the disk 10.

As shown in Figure 10, the disk 32 has the numerals 0 to 14, which represent 1° longitude increments, spaced the same distance apart as the graduations on the scales of the disk 10. The corresponding code symbols of the Georef system are shown on the periphery scale of the disk 32. It will be understood that the longitude increment and its corresponding code symbol are on the same radius emanating from the common center of the disk 32. The disk 32 has a pair of outer arcuate openings 37 and 38, which are disposed between the two scales. A pair of inner arcuate openings 39 and 40 are disposed inside of the inner scale of the disk 32 (see Fig. 10). The outer arcuate openings 37 and 38 permit the inner scale of the disk 10 to be viewed when the disks 31 and 32 are mounted on the disk 10 while the inner arcuate openings 39 and 40 permit the inner scale of the disk 31 to be viewed when the disk 32 is mounted on the disk 31. These two sets of openings permit the geographic longitude indicia and its increment to be adjacent and the 15° longitude and latitude code symbols to be adjacent. This is accomplished by the spacing of the inner scales of the disk and the arcuate openings.

Figure 9:
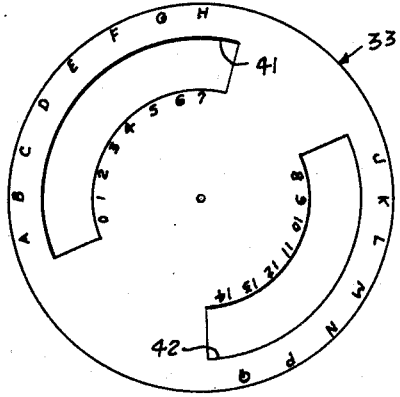
Figure 9 is a plan view of the fourth largest disk of the assembly of Figure 7.

As shown in Figure 9, the fourth largest disk 33 has the same graduations on its inner scale and its periphery scale as the third largest disk 32 of Fig. 10. However, the numerals on the inner scale of this disk 33 serve to indicate 1° latitude increments. The disk 33 is provided with a pair of arcuate openings 41 and 42 that permit the inner scales of the disks 10, 31, and 32 to be viewed when the disk 33 is mounted thereon.

Figure 8:
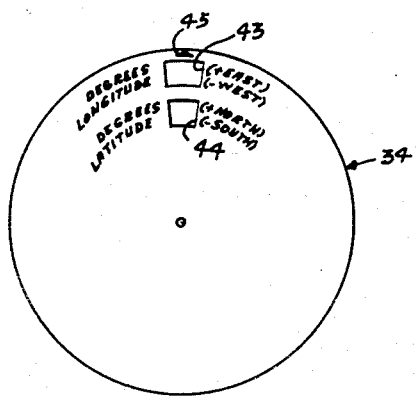
Figure 8 is a plan view of the smallest disk of the assembly of Figure 7.

The smallest disk 34, shown in Figure 8, has two arcuate windows 43 and 44, which are so designed that only one geographic indicia from each of the inner scales may be viewed therethrough. The outer arcuate window 43 shows only the geographic longitude indicia in both the 15° and 1° increments. Similarly, the inner arcuate window 44 will show only the 15° and 1° latitude increments. The particular geographic indicia that will be viewed through the windows 43 and 44 depends upon where the indicator marker 45 of the disk 34 points. For example, if it is desired to ascertain what geographic longitude and latitude are represented by the Georef code symbols WJGH, it is only necessary to align the marker 45 with these four letters (see Figure 7) and the arcuate windows 43 and 44 will show that the longitude is 126° east and the latitude 37° north. Note that the proper symbols for east and west longitude with respect to the arcuate window 43 and north and south latitude with respect to the arcuate window 44 are provided on the disk 34.

Thus, the present invention permits a rapid conversion from geographic indicia to the code letters of the Georef system if the geographic indicia are known and it is desired to convert to the Georef system. Similarly, if the Georef code symbols are known and it is desired to convert to the geographic longitude and latitude indicia, the present invention provides this information. This invention has the advantage of eliminating a laborious mechanical conversion or reference to maps containing overlays of both systems. This, of course, produces economical saving in the reduction of manpower hours to perform these duties. While the use of both sides of the converter results in more rapid conversion, it will be understood that conversion of the systems could be accomplished by using only one side of the invention.

For purposes of exemplification particular embodiments of the invention have been shown and described according to the best present understanding thereof. However, it will be apparent that changes and modifications in the arrangement and construction of the parts thereof may be resorted to without departing from the true spirit and scope of the invention.

I claim:

1. An interpreting device for inter-conversion of conventional geographic longitude and latitude indicia and their corresponding code symbols including five disks superimposed one on the other and relatively rotatable about a common center, said disks increasing in diameter from top to bottom, each of said four largest disks having two circularly arranged scales spaced from each other with one of said scales being disposed along the periphery of each of said disks to form a set of scales, the inner spaced scales of said four largest disks forming a second set of scales, one of said scales on each of said four largest disks having one of said geographic latitude and longitude indicia, the other of said scales having a corresponding code symbol for said indicia, one of said sets of scales having indicia on all of its scales, the other of said sets of scales having code symbols on all of its scales, said largest disk having 24 graduations indicating 15° increments of longitude on one of said scales equally spaced about the circumference of said scale, the other scale of said largest disk having 24 graduations indicating major longitude zone code symbols corresponding to each 15° longitude increment and equally spaced about the circumference of said scale, said fourth largest disk having 15 graduations indicating 1° increments of latitude on one of said scales spaced the same distance apart as the graduations on the scales of said largest disk, the other scale of said fourth largest disk having 15 graduations indicating minor latitude code symbols corresponding to each 1° latitude increment, one of the two remaining disks of said four largest disks having 15 graduations indicating 1° increments of longitude on one of said scales spaced the same distance apart as the graduations on the scales of said largest disk, the other scale of said one of the two remaining disks of said four largest disks having 15 graduations indicating minor longitude code symbols corresponding to each 1° longitude increment, the remaining disk of said four largest disks having 13 graduations indicating 15° increments of latitude on one of said scales spaced the same distance apart as the graduations on the scales of said largest disk, the other scale of said remaining disk of said four largest disks having 13 graduations indicating major latitude code symbols corresponding to each 15° latitude increment, said scales on said disks being so arranged that the graduations representing the 15° and 1° longitude increments are adjacent with the 15° longitude increments on the larger of the two disks, the graduations representing the 15° and 1° latitude increments are adjacent with the 15° latitude increments on the larger of the two disks, the graduations representing the major longitude and latitude zone code symbols are adjacent with the longitude symbols on the larger of the two disks, and the graduations representing the minor longitude and latitude zone code symbols are adjacent with the longitude symbols on the larger of the two disks, and means on said smallest disk to convert the indicia on one set of said scales to the symbols on the other set of said scales and vice versa.

2. An interpreting device for inter-conversion of conventional geographic longitude and latitude indicia and their corresponding code symbols including a main disk, four disks superimposed one on the other on each side of said main disk and relatively rotatable about a common center, said disks decreasing in diameter from said main disk, said main disk having two circularly arranged scales on each side spaced from each other with one of said scales on each side of said main disk being disposed along the periphery of each side of said main disk, each of said three remaining largest disks on each side of said main disk having two circularly arranged scales spaced from each other with one of said scales being disposed along the periphery of each of said disks, all of said scales along the periphery of said three remaining largest disks on one side of said main disk and of said one side of said main disk having one of said geographic longitude and latitude indicia, all of said inner spaced scales of said three remaining largest disks on said one side of said main disk and on said one side of said main disk having code symbols, all of said scales along the periphery of said three remaining largest disks on the other side of said main disk and of said other side of said main disk having code symbols, all of said inner spaced scales of said three remaining largest disks on the other side of said main disk and of said other side of said main disk having one of said geographic longitude and latitude indicia, means on said smallest disk on said one side of said main disk to convert the indicia on the periphery scales to the corresponding code symbols on the inner spaced scales, and means on said smallest disk on said other side of said main disk to convert the code symbols on said periphery scales to the corresponding indicia on the inner spaced scales.

3. An interpreting device for inter-conversion of conventional geographic longititude and latitude indicia and their corresponding code symbols incuding five disks superimposed one on top of the other and relatively rotatable about a common center, said disks increasing in diameter from top to bottom, each of said four largest disks having two circularly arranged scales spaced from each other with one of said scales being disposed along the periphery of each of said disks, said largest disk having 24 graduations indiciating 15° increments of longitude on said periphery scale equally spaced about the circumference of said scale, the inner spaced scale of said largest disk having 24 graduations indicating major longitude zone code symbols corresponding to each 15° longitude increment squally spaced about the circumference of said scale, said second largest disk having 15 graduations indicating 1° increments of longitude on said periphery scale spaced the same distance apart as the graduations on the scales of said largest disk, the inner spaced scale of said second largest disk having 15 graduations indicating minor longitude code symbols corresponding to each 1° longitude increment, said third largest disk having 13 graduations indicating 15° increments of latitude on said periphery scale spaced the same distance apart as the graduations on the scales of said largest disk, the inner spaced scale of said third largest disk having 13 graduations indicating major latitude code symbols corresponding to each 15° latitude increment, said fourth largest disk having 15 graduations indicating 1° increments of latitude on said periphery scale spaced the same distance apart as the graduations on the scales of said largest disk, the inner spaced scale of said fourth largest disk having 15 graduations indicating minor latitude code symbols corresponding to each 1° latitude increment, the inner scales on said disks being so arranged that the graduations representing the major longitude and latitude zone code symbols are adjacent with the longitude symbols being on the exterior scale and the graduations representing the minor longitude and latitude zone code symbols are adjacent with the longitude symbols on the exterior scale, and means on said smallest disk to convert the indicia on said periphery scales to the code symbols on the inner spaced scales.

4. An interpreting device for inter-conversion of conventional geographic longitude and latitude indicia and their corresponding code symbols including five disks superimposed one on the other and relatively rotatable about a common center, said disks increasing in diameter from top to bottom, each of said four largest disks having two circularly arranged scales spaced from each other with one of said scales being disposed along the periphery of each of said disks, said largest disk having 24 graduations indiciating 15° increments of longitude on said inner spaced scale equally spaced about the circumference of said scale, the periphery scale of said largest disk having 24 graduations indicating major longitude zone code symbols corresponding to each 15° longitude increment equally spaced about the circumference of said scale, said second largest disk having 13 graduations indicating 15° increments of latitude on said inner spaced scale spaced the same distance apart as the graduations on the scales of said largest disk, the periphery scale of said second largest disk having 13 graduations indicating major latitude code symbols corresponding to each 15° latitude increment, said third largest disk having 15 graduations indicating 1° increments of longitude on said inner spaced scale spaced the same distance apart as the graduations on the scale of said largest disk, the periphery scale of said third largest disk having 15 graduations indicating minor longitude code symbols corresponding to each 1° longitude increment, said fourth largest disk having 15 graduations indicating 1° increments of latitude on said inner spaced scale spaced the same distance apart as the graduations on the scale of said largest disk, the periphery scale of said fourth largest disk having 15 graduations indicating minor latitude code symbols corresponding to each 1° latitude increment, said inner spaced scale on said disk being so arranged that the graduations representing the 15° and 1° longitude increments are adjacent with the 15° longitude increment on the exterior scale and the graduations representing the 15° and 1° latitude increments are adjacent with the 15° latitude increment on the exterior scale, and means on said smallest disk to convert the code symbols on the periphery scales to the geographic indicia on said inner spaced scales.

References Cited in the file of this patent
UNITED STATES PATENTS 1,329,896     Frome _____ Feb. 3, 1920